United States Patent [19]

Fang

[11] Patent Number: 5,579,621

[45] Date of Patent: Dec. 3, 1996

[54] SCREEN FIXTURES

[76] Inventor: Chen-Kuei Fang, No. 59, Alley 496, S. Niupu Road, Hsinchu, Taiwan

[21] Appl. No.: 348,075

[22] Filed: Nov. 23, 1994

[51] Int. Cl.$^6$ .............................. E04C 2/38; F16B 9/00
[52] U.S. Cl. ...................... 52/483.1; 52/238.1; 52/656.1; 52/656.9; 403/205; 403/231
[58] Field of Search ...................... 52/235, 481.1, 52/481.2, 483.1, 489.1, 508, 656.1, 656.9, 665, 475.1, 238.1, 241; 403/205, 231, 262, 256, 274, 279, 281, 345, 363, 375, 403

[56] References Cited

U.S. PATENT DOCUMENTS

| | | | |
|---|---|---|---|
| 3,295,283 | 1/1967 | Griffith et al. | 52/481.1 |
| 3,566,561 | 3/1971 | Tozer | 52/656.1 X |
| 3,732,660 | 5/1973 | Byssing | 52/489.1 |
| 3,778,175 | 12/1973 | Zimmer | 52/656.9 X |
| 3,918,232 | 11/1975 | Edwards | 52/656.9 |
| 4,021,988 | 5/1977 | Edens et al. | 403/274 X |
| 4,193,245 | 3/1980 | Johnson | 403/231 X |
| 4,316,352 | 2/1982 | Harrington et al. | 52/235 X |
| 5,116,161 | 5/1992 | Faisst | 403/231 |

Primary Examiner—Wynn E. Wood
Assistant Examiner—Kevin D. Wilkens
Attorney, Agent, or Firm—Beveridge, DeGrandi, Weilacher & Young

[57] ABSTRACT

A connection device of screen fixtures involving a horizontal U-shaped top bar, a horizontal U-shaped bottom bar, at least one horizontal U-shaped horizontal bar, at least one I-shaped vertical bar with ribs on both inner sides, and at least one L-shaped object having a short leg and a long leg and having a frame at the intersection of the short leg and the long leg, the long leg having two screw holes for attaching the long leg to a vertical bar by two screws, the short leg having a screw hole for attaching the short leg to a top bar or the bottom bar by a screw.

1 Claim, 8 Drawing Sheets

SCREEN FIXTURES

FIELD OF THE INVENTION

The invention is with regard to the fixation of a screen including a vertical bar, a horizontal bar, a top bar, a bottom bar, an L-shaped object, a springlike sheet, and a movable pedal board. The top bar and the bottom bar are U shaped, and ribs are on both inner sides of them. The springlike sheet is inserted below the ribs. The short leg of the L-shaped object is above the ribs with screws going through both the springlike sheet and the short leg between the top and the bottom bars. The long leg of the L-shaped object is snapped in the ribs of the vertical bar. The vertical bar is kind of I-shaped, and ribs are on both inner sides of it for snapping the long leg of the L-shaped object, thus two springlike sheets hold the top bar, the bottom bar, and the vertical bar rigidly with the vertical bar in-between. There are grooves on both the outer lateral sides of the vertical bar, the shape of the bottom part slants inwards so that the horizontal bar can be inserted smoothly. The horizontal bar is kind of U-shaped. The gasket hooks are at either end of the horizontal bar. On both the lateral sides near the angular places there lies a long hold which enables the bottom shape of the vertical bar to insert in the horizontal bar, thus securing both the vertical and horizontal bars tightly. A movable pedal board lies at the bottom part of the screen. The movable pedal board comprises a column shell and an archlike board. A long cover board outside the archlike board is used to cover the empty space of the screen.

Background of the Invention

The conventional connection method of screen fixtures and the like is mostly by welding or screwing. The ways of welding can incur great variation coming from different welders, meanwhile the screen cannot be dismantled afterwards when it has been welded. If a screen is to be moved from one place to another, the user has to tear it apart, thus causing damage to the screen, and the screen can no longer be used. What a waste! The work of drilling holes for screws is also troublesome. Besides, rigidness is doubtful since every screw must be absolutely tightly-screwed in order to secure each bar of the screen. However, the effect falls short of our expectations. The total strains and stresses exerted by screws are generally not rigid enough. Ordinarily speaking, a conventional screen cannot screen sounds effectively unless sound absorbent material is added, an inconvenient device for screening. When mounting a conventional screen the assembly order is from the screen base to the upper part. Often the rest of the parts of the screen have to be cut off because of differing wall heights. To cut off a part of a screen makes the residue worthless since the composition of a screen is chiefly leather or flannel. Doing so makes the appearance of a screen disappointing.

SUMMARY OF THE INVENTION

Accordingly, it is an object of this invention to provide an improved securing arrangement for a screen. It comprises a vertical bar, a top bar, a bottom bar, a horizontal bar, an L-shaped object, a pair of springlike sheets, and a movable pedal board. The top and bottom bars are kind of U-shaped. There are ribs on each inner side of top and bottom bars for snapping together both the short leg of the L-shaped object and the springlike sheet. The long leg of the L-shaped object is snapped by the vertical bar. The vertical bar is kind of I-shaped. Ribs like on both the inner sides of the vertical bar for snapping the long leg of the L-shaped object with screws rigidly fastened so that both the top and bottom bars can be secured tightly. The horizontal bar snaps the outer slant shape of the vertical bar. The movable pedal bar is at the bottom of the screen. It is composed of a column shell, an archlike board, and a long cover board. The column shell has an opening. The cam rims are on either outer side of the shell for snapping the snap grooves of the archlike board. Outside the snap board there is a long cover board that covers the empty space of the screen. The invention so designed has the merits listed below:

1. It is an easy task to mount or dismantle bars of a screen.
2. The structure of the screen bars enhances the strength of connection.
3. Wiring is available.
4. It decreases the material cost.
5. The long cover board of the movable pedal board covers the empty space at the bottom of the screen.
6. The pedal board is easily mounted and dismantled since it is movable.

With these merits the defects of conventional bars can be corrected entirely. This is truly a delicate invention of screen connection fixtures. Other objects and purposes of the invention will be apparent to examiners on reading the following specification and inspecting the accompany drawings.

DETAILED DESCRIPTION OF THE INVENTION

Figure 1:
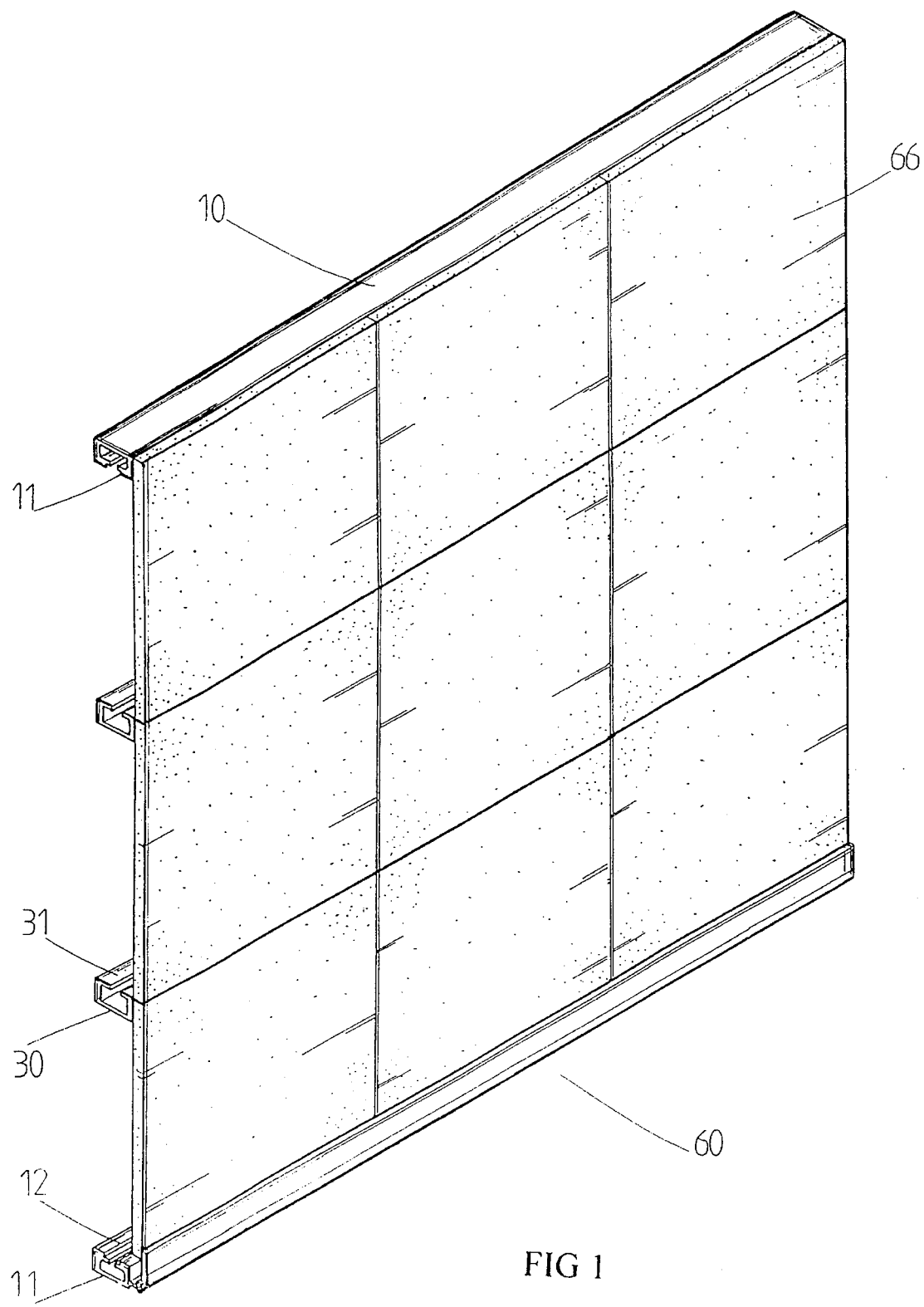
FIG. 1 is an assembly view of the invention
Figure 2:
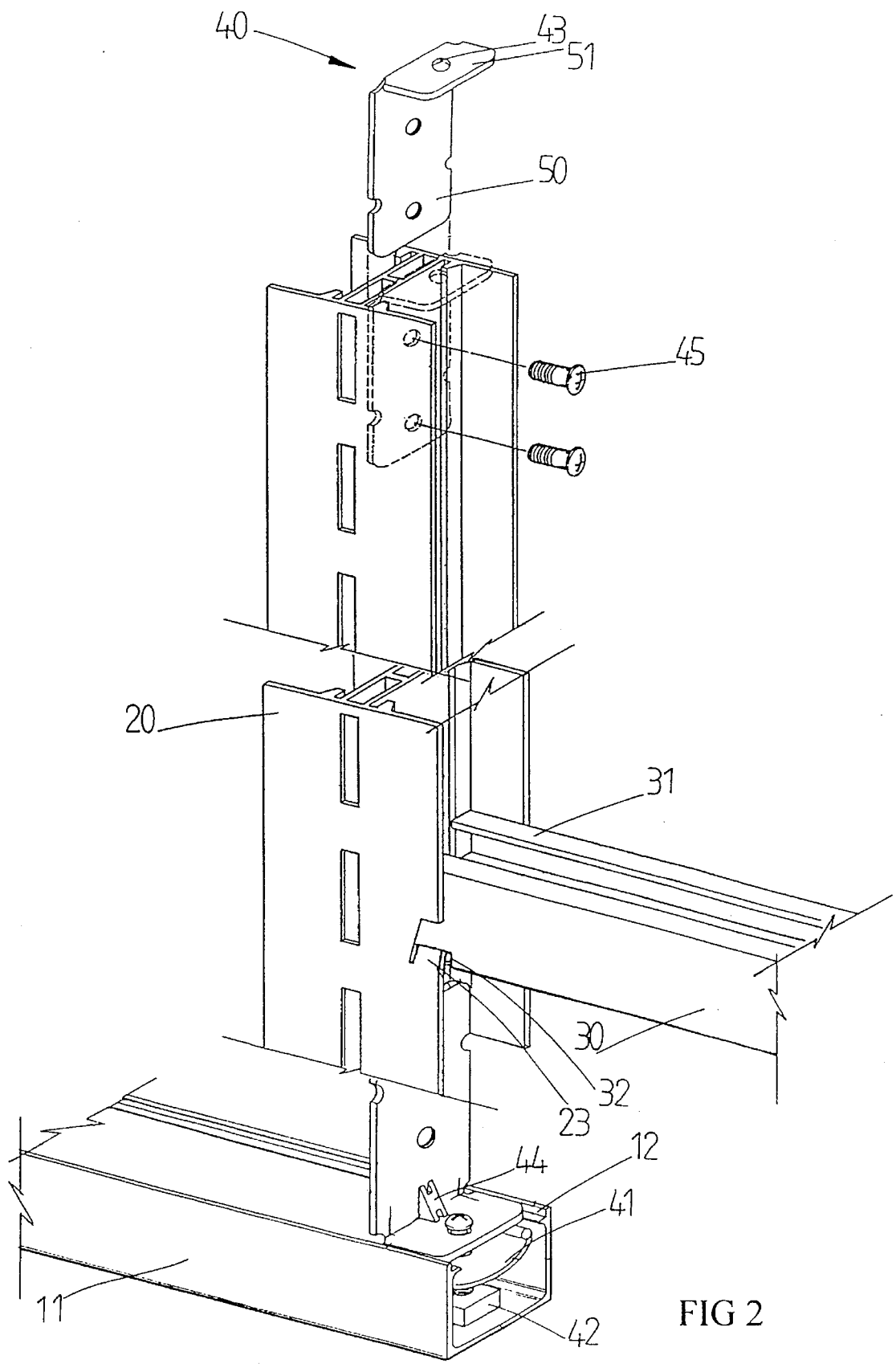
FIG. 2 is a view of this invention.

Let's begin from FIG. 1. FIG. 1 is an assembly view of this invention. The invention is with regard to a connection device of screen fixtures which includes a top bar (10), a bottom bar (11), a vertical bar (20), a horizontal bar (30), an L-shaped object (40), a springlike sheet (41), and a movable pedal board (60). When compared to FIG. 2 we see that the L-shaped object is right-angled. There is a frame (44) on the right-angled base which reinforces the said object. There are two screw holes (43) drilled in the long leg (50) of the object, and one screw hole (43) in the short leg (51) of the object. Another screw hole (43) is drilled in the middle of the springlike sheet (41). Both the top (10) and the bottom (11) bars are kind of U-shaped. Ribs (12) are located on the both inner sides of these two bars for snapping not only the short leg (51) of the L-shaped object (40) but the springlike sheet (41), with screw nuts (42) rigidly secured. The vertical bar (20) is kind of I-shaped. Ribs (21) are on the both inner sides of the vertical bar which snap the long leg (50) of the L-shaped object (40) secured by screws (45), thus uniting the vertical bar (20) to both the top (10) and the bottom (12) bars. Grooves (22) lie on both sides of the vertical bar (20). The tangent surfaces (23) of the grooves (22) slant inwards a little bit. This helps them to insert in the horizontal bar (30) smoothly. The horizontal bar is kind of U-shaped. A gasket hook (31) is at the top of the horizontal bar. At both the right angles on the base of the horizontal bar there is a long hole (32) for holding the tangent surfaces (23) of the grooves (22) of the vertical bar (20), which also helps the insertion of the horizontal bar (30) hence uniting both the vertical (20) and the horizontal (30) bars.

Figure 3:
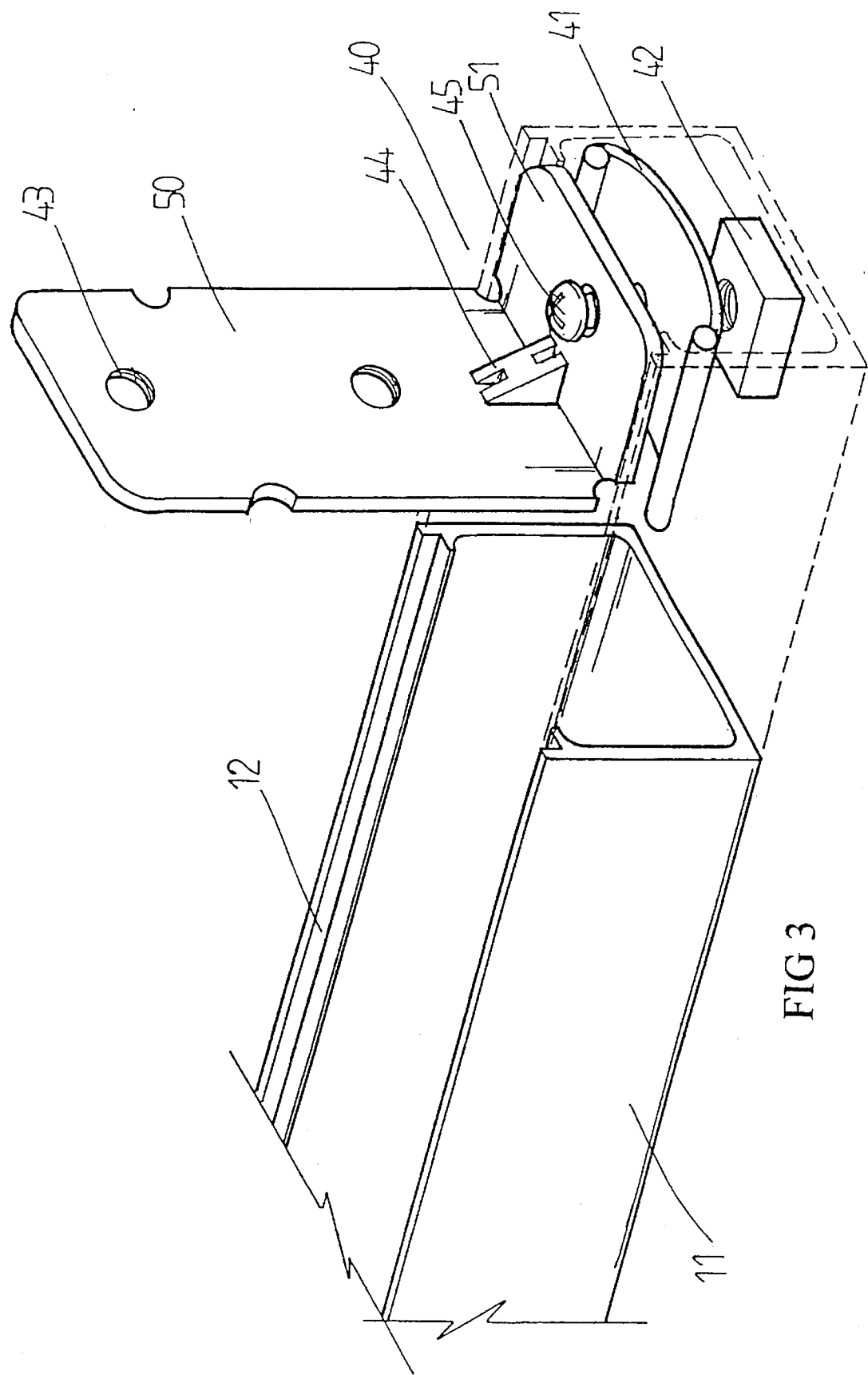
FIG. 3 is the structure of the invention.
Figure 4:
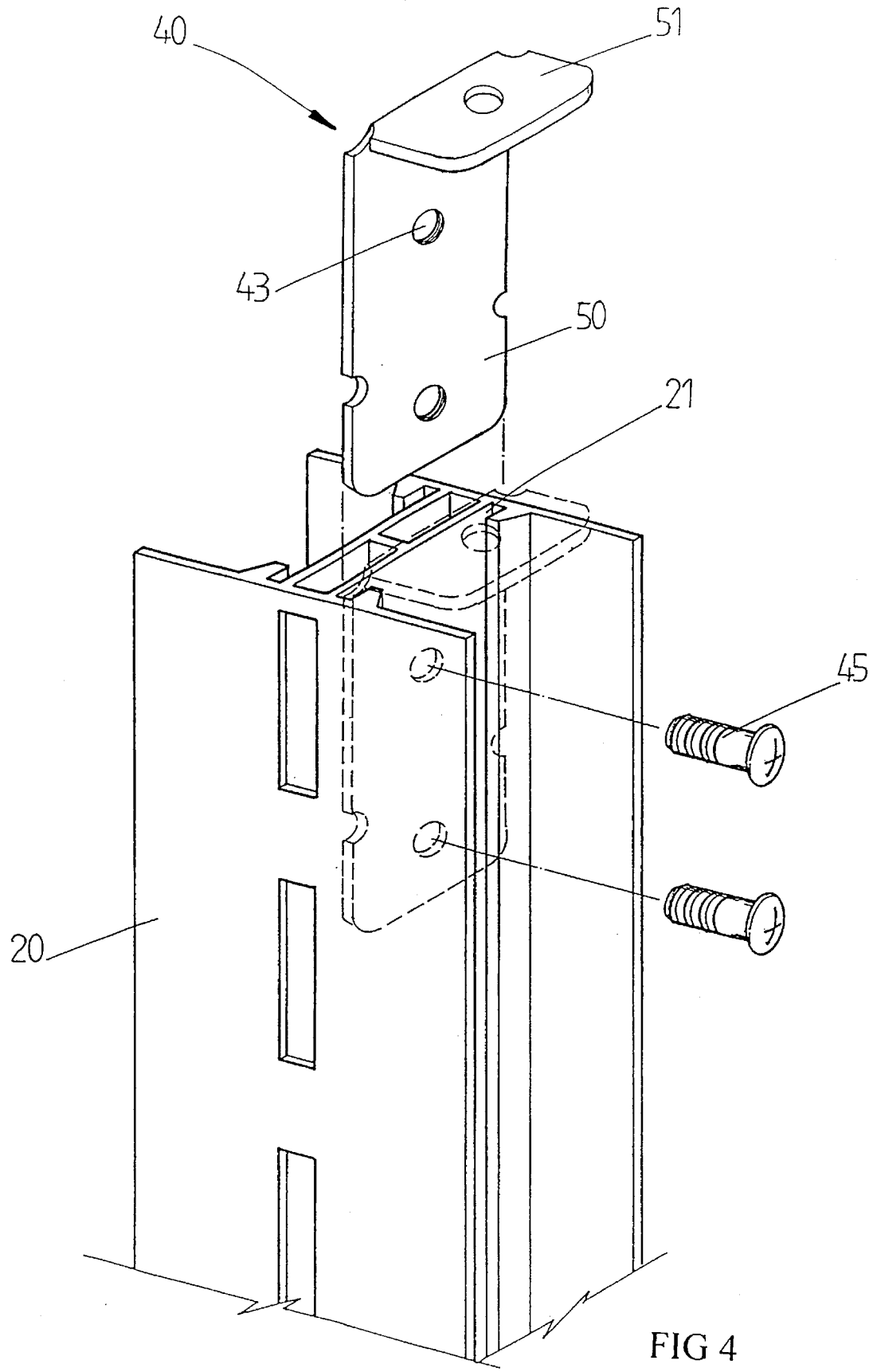
FIG. 4 is the structure of the invention.

Taking a view of FIG. 3 we can see that the bottom bar (11) is U-shaped, and ribs (12) are at the top of both inner sides. The springlike sheet (41) is below the ribs (12), and the short leg (51) of the L-shaped object (40) is above the ribs (12). A screw (45) is used to secure both the short leg (51) of the L-shaped object (40) and the springlike sheet (41) with a screw nut (42) rigidly fastened to it. The long leg (50) of the L-shaped object (40) is snapped in the vertical bar (20). In FIG. 4 the vertical bar is kind of I-shaped. Ribs (21) are in the vertical bar that snap the long leg (50) of the L-shaped object (40) with a screw (45) rigidly fastened, thus uniting the vertical bar (20) to both the bottom (11) and the top (10) bars.

Figure 5:
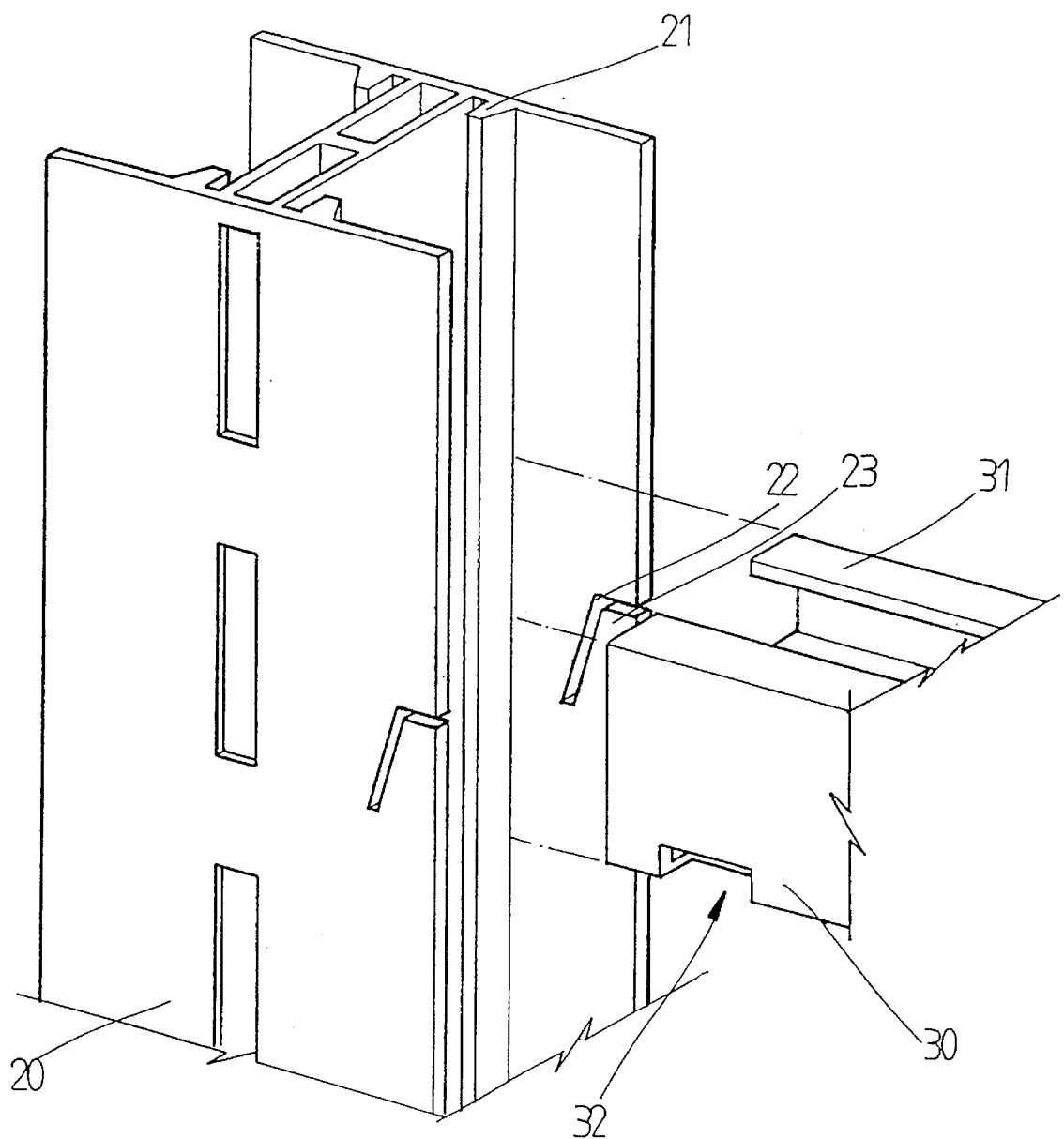
FIG. 5 is the structure of the invention.
Figure 6:
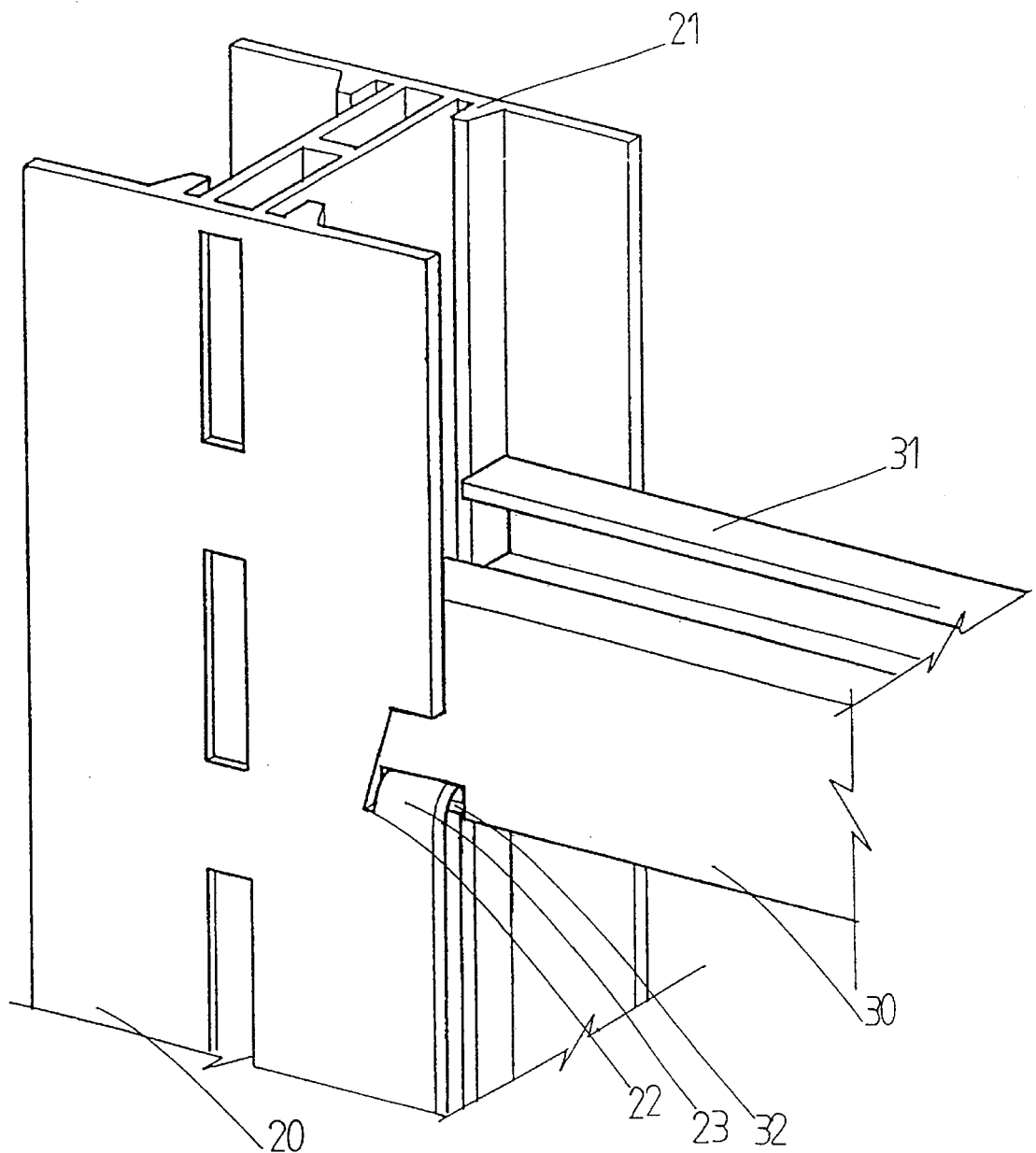
FIG. 6 is an assembly view of the invention.

FIG. 5 is a fragmentary perspective view of the invention. The horizontal bar is U-shaped. A gasket hook (31) is installed at the top. At its bottom there is a long hole (32) extending to the bottom of the horizontal bar (30) which snaps the downward tangent surfaces (23) of grooves (22) of the vertical bar (20). When compared to FIG. 6 we can see that the downward tangent surfaces (23) of the grooves (22) of the vertical bar (20) are nicely inserted and snapped by the long hole (32) of the horizontal bar (30), thus reinforce the connection between the vertical bar (20) and the horizontal bar (30).

Figure 7:
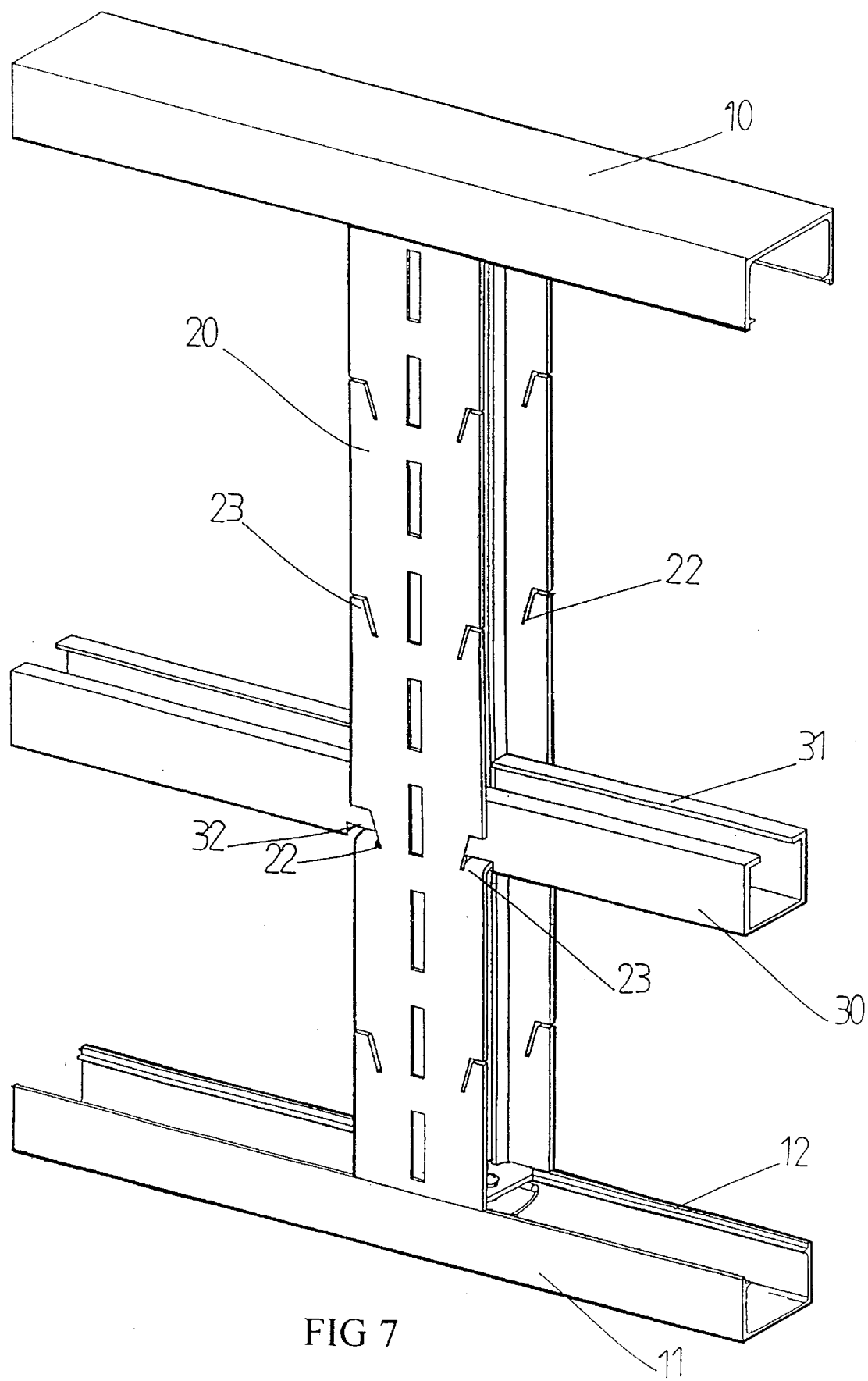
FIG. 7 is an assembly view.

Refer to FIG. 7. It is an example of the screen exemplified. By using those installations mentioned above the bars of a screen can be united as one entity, thus forming a concrete screen structure. Besides, all the connection nodes are fastened by screws. Mounting or dismantling a screen becomes an easy task by untightening screws.

Figure 8:
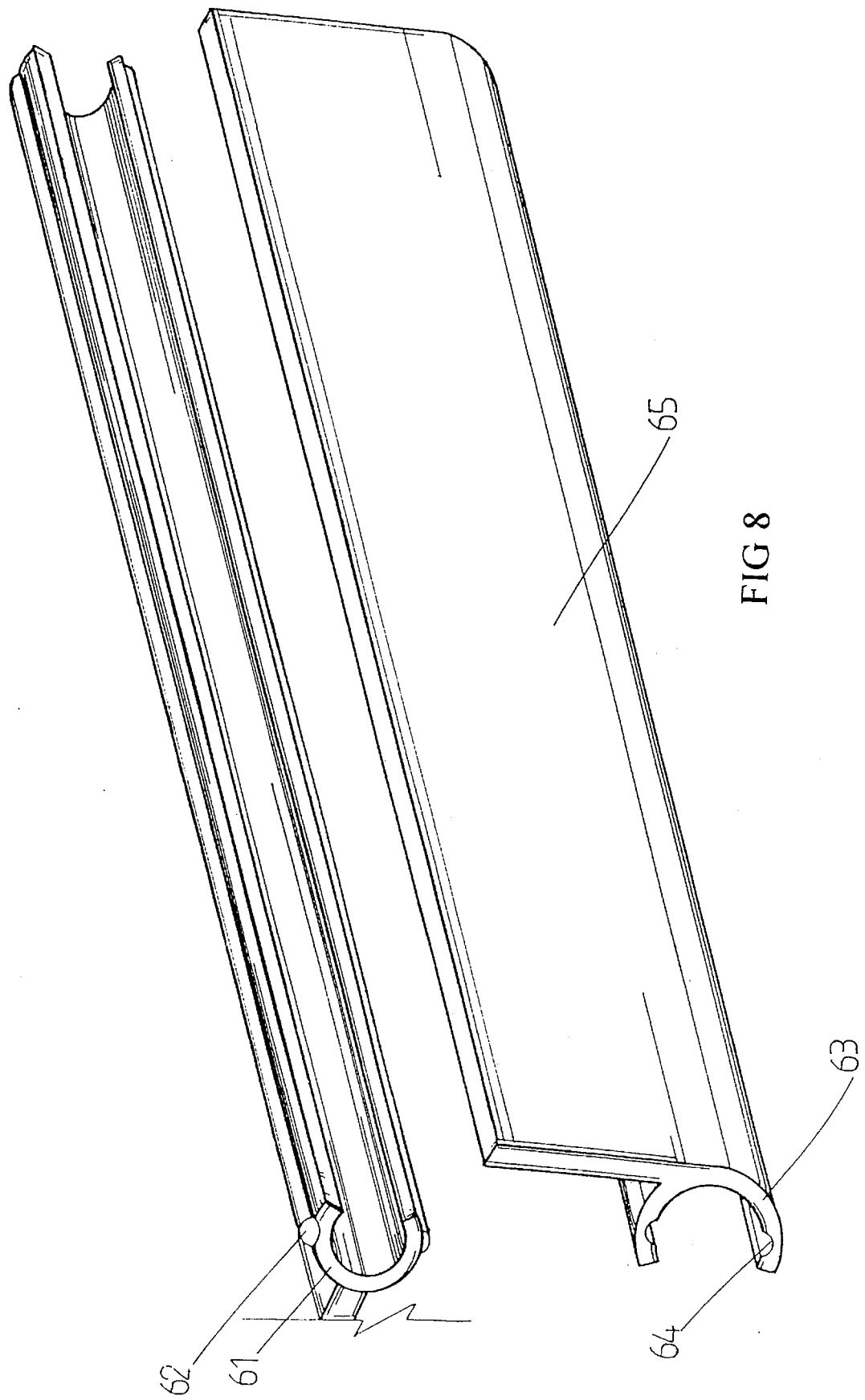
FIG. 8 is the structure of the invention.

FIG. 8 is the structure of the invention. The movable pedal board (60) is mounted below the vertical bar (20) of a screen. It comprises a column shell (61), an archlike board (63), and a cover board (65). The column shell (61) has an opening. Cam rims (62) are located on either side of the shell for snapping the grooves (64) of the archlike board (63), thus making the archlike board (63) cohere to the column shell (61). The cover board (65) is outside the archlike board (63) that covers the empty space of a screen. Compared to FIG. 1 the screen surface (66) is mounted from top to bottom. However, since wall fixtures are usually not of the same height in contrast to the definable area of a screen surface, thus making the bottom of the screen surface (66) occupied by empty space. This is the reason why a movable pedal board (60) is designed below the vertical bar (20). The board comprises a column shell (61), an archlike board (63), and a cover board (65). The column shell (61) has an opening. Cam rims (62) are on both sides of the shell that snap the grooves (64) of the archlike board (63). This makes the archlike board (63) cohere to the column shell (61). A cover board (65) is designed outside the archlike board (63) for covering the empty space of a screen. Compared to FIG. 1 we see that the screen surface (66) is mounted from top to bottom. The surface of a screen (66) is definable in contrast to variant heights of walls. As a screen is mounted, the length of the screen surface (66) may not fully cover the gap created by variance of wall heights, hence it leaves the screen surface (66) an empty space at the bottom of the screen. This makes it necessary to set a movable pedal board (60) under the vertical bar (20) for covering the empty space using a cover board (65), thus making the screen surface (66) identical from top to bottom. To cut off surplus of a screen as an adjustment will not be necessary, no matter how different the dimensions of a screen may be. Definable dimensions of a screen surface (66) become general environments. Wiring may be set up by the gap between the vertical bar (20) and the cover board (65) hence avoiding tripping hazards. The movable pedal board (60) can be mounted or dismantled easily because it is movable.

Judging from the description mentioned above it can be clearly seen that the screen fixtures is an ideal invention. It hasn't been published in any publication, and it meets basic requirements of new patent application.

Though a particular preferred embodiment of the invention has been disclosed in detail for illustrative purposes, it will be recognized that variations or modifications of the disclosed invention, including the rearrangements of parts, lie within the scope of the present invention.

I claim:

1. A connection device of screen fixtures, comprising:

a horizontal U-shaped top bar;

a horizontal U-shaped bottom bar;

at least one intermediate U-shaped horizontal bar;

at least one I-shaped vertical bar with ribs on both inner sides defining a first groove between parallel outer flanges of said I-shaped vertical bar and a transverse web connecting said outer flanges; and at least one L-shaped object having a short leg and a long leg and having a frame at the intersection of said short leg and said long leg, said long leg having two screw holes for attaching said long leg to a vertical bar by two screws, said short leg having a screw hole for attaching said short leg to said top bar or said bottom bar by a screw;

said top bar having ribs on both inner sides thereof defining a second groove between free ends of said U-shaped bar and a transverse web connecting said free ends, said second groove being capable of holding within said top bar a springlike sheet having a screw hole in the middle of said sheet to receive a screw for attaching a short leg of an L-shaped object to said top bar;

a springlike sheet having a screw hole in the middle of said sheet to receive a screw for attaching a short leg of an L-shaped object to said top bar, said springlike sheet being held in said second groove in said top bar and being attached to said short leg of said L-shaped object, said short leg of said L-shaped object located on an opposite side of said second groove and in contact with said ribs thereof;

said bottom bar having ribs on both inner sides thereof defining a third groove between free ends of said U-shaped bar and a transverse web connecting said free ends, said third groove being capable of holding within said bottom bar a springlike sheet having a screw hole in the middle of said sheet to receive a screw for attaching a short leg of an L-shaped object to said bottom bar;

a springlike sheet having a screw hold in the middle of said sheet to receive a screw for attaching a short leg of an L-shaped object to said bottom bar, said springlike sheet being held in said third groove in said bottom bar and being attached to said short leg of said L-shaped object, said short leg of said L-shaped object located on an opposite side of said third groove and in contact with said ribs thereof;

said first groove of said vertical bar capable of receiving a long leg of an L-shaped object;

said vertical bar having vertical tongues slanting inward on both outer flanges for attaching to said intermediate horizontal bar;

said intermediate horizontal bar having a gasket hook on the top thereof and having on the bottom and sides thereof a long hole for receiving said tongues of said vertical bar;

said vertical bar being connected to said intermediate horizontal bar;

said bottom bar having attached thereto a column shell with a C-shaped opening and cam rims on both exterior sides of said opening;

said column shell capable of receiving a C-shaped archlike board with snap grooves on both inner sides for snapping said cam rims of said column shell, wherein a vertical cover board is attached to said archlike board.

* * * * *